March 18, 1947.    E. W. HALL    2,417,645
ROTARY ABRADING TOOL
Filed Aug. 24, 1944

INVENTOR.
Elisha W. Hall.
BY
Attys.

Patented Mar. 18, 1947

2,417,645

UNITED STATES PATENT OFFICE 2,417,645

ROTARY ABRADING TOOL

Elisha W. Hall, Scituate, Mass.

Application August 24, 1944, Serial No. 550,916

6 Claims. (Cl. 51—193)

This invention relates to rotary abrading tools of the class in which the abrading is accomplished by a cylindrical surface, and it is more particularly concerned with a buffing wheel section intended to be combined with other like sections disposed coaxially and clamped face to face by end plates and nuts on a spindle. In the present invention the wheel section has an annular body of abrading material encircling and bonded to a hub-receiving ring in which a separate and distinct hub is inserted, the arrangement being such that the wheel section presents no lateral projections and hence the peripheries of the sections present a continuous cylindrical surface which is important because it does not tend to groove the work.

The invention will be understood by reference to the following description when taken in connection with the accompanying drawings of one specific embodiment thereof, while its scope will be pointed out more particularly in the appended claims.

Figure 1:
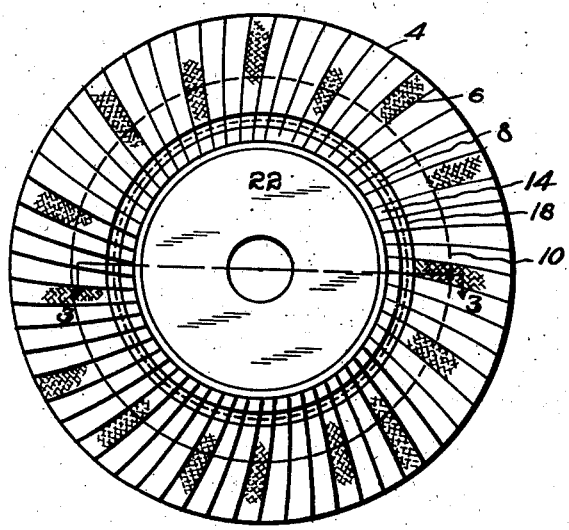
Fig. 1 is an end elevation of a wheel section embodying the invention.
Figure 2:
Fig. 2 is a side elevation of the same.

Referring to the drawing and to the embodiment of the invention illustrated therein by way of example, there is shown a wheel section comprising an annular body 4 of abrading material such as bias-cut cotton cloth in one or more, usually a plurality of strips forming plies ruffled to form radial pleats 6 which in this instance are stitched by circular rows 8 and 10 of thread through the plies. In this case, the ruffled, laminated strip 12 is a helical coil (see Fig. 2) though in some cases separate flat coils might be employed. In any case, the coil or coils encircle and are bonded to a hub-receiving ring now to be described.

Figure 3:
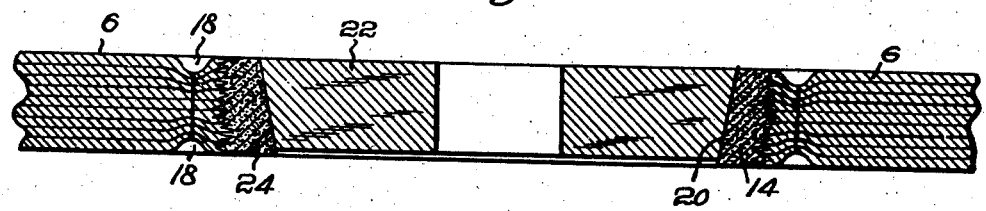
Fig. 3 is a sectional view on an enlarged scale on line 3—3 of Fig. 1.

In the present example, the annular body of abrading material is bonded to a ring 14 (see Fig. 3) of adhesive plastic, such as polyvinyl chloride, 5 parts, and dibutyl phthalate, 1 part, applied, for example, at a temperature of 275° F. and under a pressure of 2000 pounds per square inch, which conditions are found to cause the material to penetrate the flutes or corrugations of the ruffles or pleats 6 and even the individual threads of the fabric, thus bonding the ring and the fabric so firmly that the union is permanent and has a high tensile strength, in the region of several hundred pounds. To prevent too great penetration of the plastic into the fabric, the mold should be provided with annular ridges which will press into the fabric and produce annular grooves 18 between which the fabric is so highly compressed that penetration of the plastic into the fabric is limited.

This bonding of the plastic ring to the annular body of abrading material has several advantages over other arrangements such as metallic rings heretofore employed. One advantage is the fact that there are no lateral projections to cause undesired separation of the sections at the working surface, whereas metallic rings commonly employed have lateral projections producing separation. Another advantage is the fact that a low-cost hub may be employed. Yet another is the fact that hubs with holes of different diameters may be interchanged where they are to be applied to spindles of different diameters. Still other advantages may be evident.

To take the fullest advantage of this construction, the ring 14, as herein constructed, has an internal, circumferential surface 20 which is tapered, and a hub 22 of wood, for example, much lower in cost than the plastic of the ring, is provided with a correspondingly tapered, internal, circumferential surface 24 snugly fitting the internal surface 20 of the ring. To make sure of a tight fit, yet without the possibility of any projection of the hub from either side beyond the ring (and which would separate adjacent sections at the working surface) the dimension of the hub in an axial direction is less than the axial dimension of the ring and the diameters of the circumferential surfaces are properly determined. The hub is put in under pressure sufficient to cause its larger end to be flush with the corresponding face of the ring.

Thus, when several such sections are assembled, coaxially, face to face, on an arbor, and clamped by flanged clamping plates overlapping the annular joints between the hubs and the rings, the hubs are pressed firmly into the tapered sockets presented by the rings, and the resulting mass functions like one solid body, yet without interruptions in the working surface. The advantages of the described construction are therefore apparent.

Having thus described one embodiment of the invention, what I claim is:

1. In a rotary abrading tool, the combination of an annular body of textile abrading material, and a body of adhesive plastic encircled by and penetrating into said annular body, said abrading material being highly compressed in an annular zone about and radially outward beyond said body of plastic material and limiting such penetration.

2. In a rotary abrading tool, the combination of an annular body of ruffled cloth, and a body of adhesive plastic material encircled by and penetrating into said annular body, said annular body being compressed and its thickness reduced in an annular zone about and radially outward beyond said body of plastic material and limiting such penetration.

3. In a rotary abrading tool, the combination of an annular body of ruffled cloth, and a body of adhesive plastic material encircled by and penetrating into said annular body, said annular body being compressed in an annular zone about and radially outward beyond said body of plastic material and relatively uncompressed about said zone.

4. In a rotary abrading tool, the combination of an annular body of ruffled cloth, and a body of plastic material encircled by and penetrating into said annular body, said annular body being compressed and its cross-section reduced in a region about and radially outward beyond and adjacent to said plastic material and limiting such penetration.

5. In a rotary abrading tool, the combination of a set of annular plies laid face to face and forming a continuous annular body of abrading material which is compressed and its thickness reduced in an annular zone, and an annular body of adhesive plastic encircled by and penetrating said abrading material and limited in such penetration by such compression.

6. In a rotary abrading tool, the combination of a set of annular, corrugated plies laid face to face and forming a continuous annular body of abrading material which is compressed and its thickness reduced in an annular zone, and an annular body of adhesive plastic encircled by said abrading material and penetrating the corrugations thereof, the extent of such penetration being limited by such compression.

ELISHA W. HALL.

REFERENCES CITED

The following references are of record in the file of this patent:

UNITED STATES PATENTS

| Number | Name | Date |
|---|---|---|
| 533,833 | Webster | Feb. 5, 1895 |
| 2,034,576 | Hall | Mar. 17, 1936 |
| 2,087,105 | Hall | July 13, 1937 |
| 2,146,284 | Churchill | Feb. 7, 1939 |
| 163,025 | Morrison | May 11, 1875 |
| 1,963,247 | Read | June 19, 1934 |
| 2,203,788 | Jenks | June 11, 1940 |
| 2,070,734 | Voegeli-Jaggi | Feb. 16, 1937 |
| 2,124,114 | L'Hommedieu | July 19, 1938 |
| 2,355,667 | Melton et al. | Aug. 15, 1944 |
| 294,847 | Burridge | Mar. 11, 1884 |
| 2,027,863 | Hall | Jan. 14, 1936 |